United States Patent [19]

Luedeman

[11] Patent Number: 4,645,010

[45] Date of Patent: Feb. 24, 1987

[54] LAWN EDGER

[76] Inventor: Harold J. Luedeman, 950 E. Wye La., Fox Point, Wis. 53217

[21] Appl. No.: 666,241

[22] Filed: Oct. 29, 1984

[51] Int. Cl.⁴ .......................... A01B 1/24; A01G 3/06
[52] U.S. Cl. ..................................... 172/13; 172/375; 30/315
[58] Field of Search ................... 172/13, 14, 18, 375; 294/49, 55, 56; 30/315, DIG. 5

[56] References Cited

U.S. PATENT DOCUMENTS

| | | | |
|---|---|---|---|
| 1,113,984 | 10/1914 | Glass | 172/13 |
| 1,232,255 | 7/1917 | Evans | 172/13 |
| 1,343,269 | 6/1920 | Lees | 172/18 |
| 1,411,166 | 3/1922 | Currier | 294/49 |
| 1,931,349 | 10/1933 | Habig . | |
| 2,007,826 | 7/1935 | Fickes . | |
| 2,503,757 | 4/1950 | Morgan | 30/315 |
| 2,513,730 | 7/1950 | Little | 172/18 X |
| 2,594,508 | 4/1952 | Sitton . | |
| 2,822,740 | 2/1958 | Wassinger | 172/13 |
| 3,078,927 | 2/1963 | Wetzel . | |
| 3,358,776 | 12/1967 | Alecci | 172/18 |
| 4,052,791 | 10/1977 | Anesi | 172/13 |
| 4,437,523 | 3/1984 | Isbell . | |

FOREIGN PATENT DOCUMENTS 227966  5/1960  Australia ............................ 172/13

OTHER PUBLICATIONS

Advertizing Catalog of Allegheny International Group, Shiremantown, Pa.

Primary Examiner—Richard J. Johnson
Attorney, Agent, or Firm—Andrus, Sceales, Starke & Sawall

[57] ABSTRACT

A combination tool for edging lawns adjacent walkways and the like and for removing the cut strips of lawn. The tool includes a foot plate, an upright elongated handle attached to the foot plate, an edging blade depending from the foot plate for cutting a strip of lawn adjacent a walkway, and a lifting blade projecting from the foot plate having an outer curved end for lifting the cut strip of lawn leaving a desired groove adjacent a walkway. The edging blade is channel-shaped and includes a pair of legs disposed at its opposite ends each having an abutment surface engageable with the walkway for positioning the blade in spaced relation to the walkway when the blade is forced downwardly to edge the lawn. A relief opening is located at each end of the edging blade which prevents the jamming of a strip of lawn between the blade, foot plate and legs. The foot plate also includes a guide surface adjacent the lifting blade which rides along the top of the walkway for properly positioning the lifting blade.

8 Claims, 4 Drawing Figures

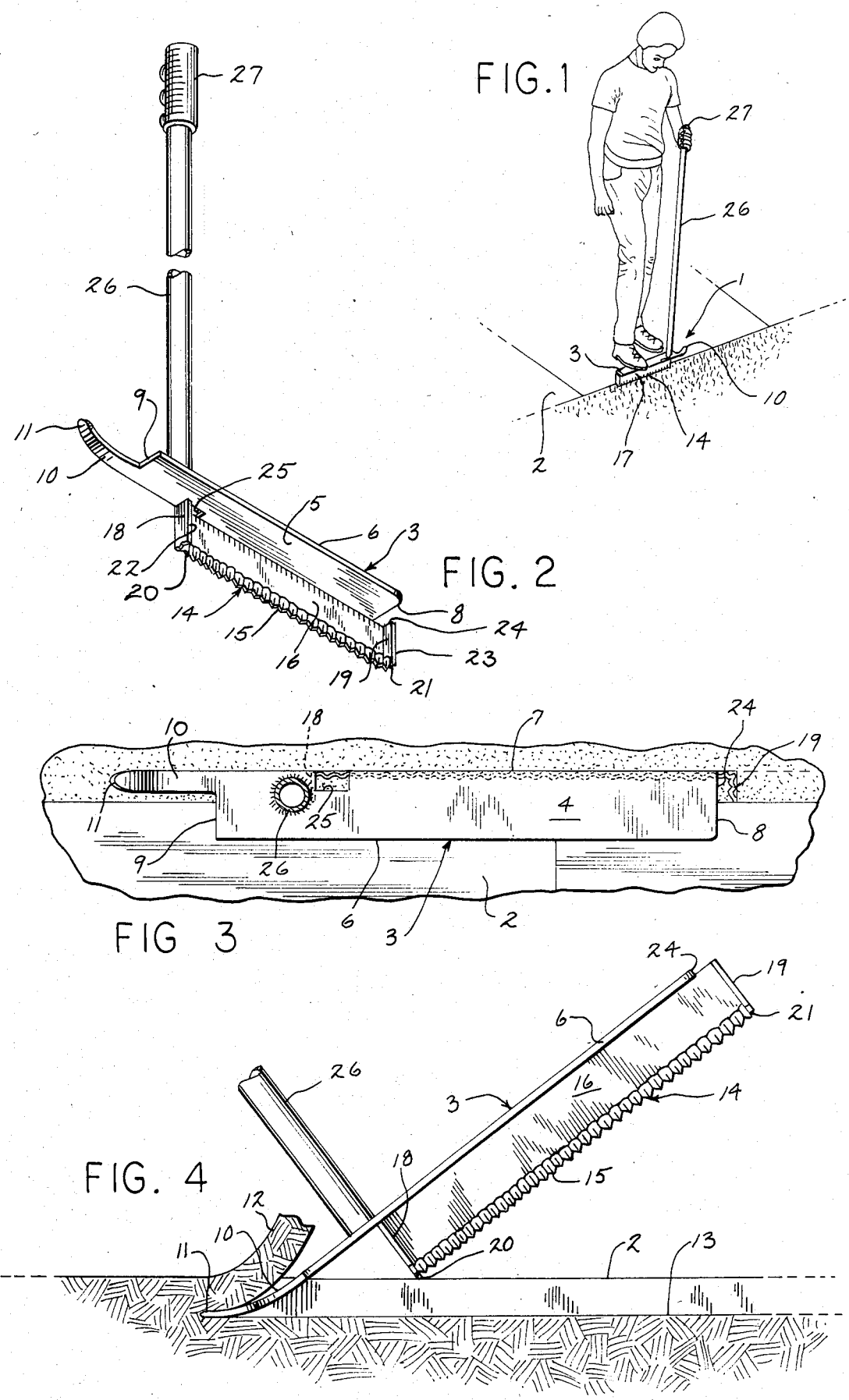

LAWN EDGER

BACKGROUND OF THE INVENTION

The present invention relates to garden tools, and more particularly to a tool for edging or trimming lawns around sidewalks, driveways, curbs and the like.

Various types of lawn edging tools are known. Motorized edgers generally include a vertical cutting blade and a gas or electric motor for rotating the cutting blade. While such motorized devices are adequate for edging lawns, they are relatively expensive, require relatively frequent replacement or resharpening of the cutting blade, and frequently become jammed if used when the lawn is damp.

Various manual lawn edging tools have also been used for trimming lawns. See for example Habig, U.S. Pat. No. 1,931,349; Fickes, U.S. Pat. No. 2,007,826; Morgan, U.S. Pat. No. 2,503,757; Sitton, U.S. Pat. No. 2,594,508; Wetzel, U.S. Pat. No. 3,078,927; Anesi, U.S. Pat. No. 4,052,791; and Isbell, U.S. Pat. No. 4,437,523. Each of the above patents disclose foot operated edgers generally including a foot plate, an edging blade and an elongated handle engageable by a user. The Fickes and Wetzel patents both show edgers which include a guide member positionable in abutting relationship with the walkway for positioning the edging blade in spaced relation to the walkway. None of the above edgers, however, include a device for removing the strip of lawn cut by the edger in order to provide the desired groove adjacent a walkway. Therefore, there remains a need for an improved edger that not only trims a lawn adjacent walkways and the like, but also removes the strips of lawn cut by the edger.

SUMMARY OF THE INVENTION

A combination tool for edging lawns adjacent walkways and the like and for removing the strips of lawn cut thereby. The tool includes a foot plate, an elongated handle attached to the foot plate, an edging blade depending from the foot plate for cutting a strip of lawn adjacent a walkway, and a lifting blade projecting from the foot plate having an outer end positionable beneath a cut strip of lawn to lift the cut strip of lawn leaving a desired groove adjacent a walkway.

The foot plate includes a guide surface engageable with the top of a walkway and the lifting blade projects substantially perpendicular to the guide surface. The guide surface provides a guide for properly positioning the lifting blade beneath a cut strip of lawn so that as the guide surface is forced along the top of the walkway the outer end of the lifting blade lifts the cut strip of lawn leaving the desired groove adjacent the walkway. The outer end of the lifting blade is curved upwardly to aid in removal of the cut strip of lawn.

The edging blade includes spacer means having an abutment surface engageable with a side of the walkway for positioning the edging blade in spaced relation to the walkway when the edging blade is forced downwardly to edge a lawn. The spacer means includes integral legs positioned at the forward and rearward ends of the edging blade which includes lower cutting edges located in a co-planar relationship with the cutting edge of the edging blade so as to form a three-sided or channel-shaped edging blade. The edging blade is thus properly spaced from the walkway to provide the desired groove adjacent the walkway.

The edging blade extends beyond the rearward end of the foot plate to form a first relief opening between the end of the foot plate and the rear leg of the edging blade. A second relief opening is formed through the foot plate adjacent the front leg of the edging blade. These relief openings prevent the jamming of a strip of lawn in the corners formed between the blade, foot plate and legs during edging.

BRIEF DESCRIPTION OF THE DRAWINGS

The drawings illustrate the best mode presently contemplated of carrying out the invention.

In the drawings:

FIG. 1 is a perspective view illustrating the lawn edging device of the present invention being used to trim a lawn adjacent a sidewalk;

FIG. 2 is a perspective view thereof;

FIG. 3 is a fragmentary top plan view thereof; and

FIG. 4 is a side view in elevation illustrating the lawn edging device of the present invention being used to lift out a cut strip of lawn.

DESCRIPTION OF THE PREFERRED EMBODIMENT

Referring now to the drawings, FIG. 1 illustrates a lawn edger generally designated by the numeral 1 being used to edge a lawn adjacent a walkway 2. Although illustrated as a sidewalk, walkway 2 may also be employed to trim the edges of lawns adjacent to curbs, driveways or the like.

Edger 1 includes a relatively thin, flat foot plate 3. Foot plate 3 is rectangular in shape and includes a substantially planar foot receiving top surface 4 and bottom surface 5. Foot plate 3 also includes an inner edge 6, an outer edge 7, a rear edge 8 and a front edge or guide surface 9. Foot plate 3 may be constructed of any substantially rigid material such as metal and may be fabricated in any known manner.

Edger 1 further includes an integral projection or lifting blade 10 extending from the forward end of foot plate 3. Lifting plate 10 is a relatively thin, flat member positioned along outer edge 7 of foot plate 3 adjacent guide surface 9 to project substantially perpendicular to guide surface 9. Blade 10 includes an upwardly curved outer end 11 that is positionable beneath a cut strip of lawn 12, as shown best in FIG. 4, so that as guide surface 9 is forced along the top of walkway 2 outer end 11 of blade 10 lifts a cut strip of lawn 12 leaving a desired groove 13 adjacent walkway 2.

Edger 1 also includes an edging blade 14 depending from bottom surface 5 of foot plate 3 for cutting a strip of lawn 12 adjacent walkway 2. Edging blade 14 is a relatively thin, flat member having an upper edge attached along outer edge 7 of bottom surface 5 of foot plate 3 and a lower cutting edge having serrations 15 formed therealong. Blade 14 includes a first inner side 16 facing walkway 2 and a second outer side 17 opposite side 16 facing the lawn when blade 14 is in proper position to be forced downwardly to edge a lawn.

As a means for positioning blade 14 in spaced relation to walkway 2 when blade 14 is forced downwardly to edge a lawn, edger 1 includes spacers or legs 18 and 19 projecting inwardly from inner side 16 of blade 14. Legs 18 and 19 are integrally formed at the forward and rearward ends respectively of edging blade 14. Legs 18 and 19 include lower serrated cutting edges 20 and 21, respectively, that are located in a coplanar relationship with the serrations 15 of edging blade 14 to form a three-sided or channel-shaped blade 14. Legs 18 and 19 each include an abutment surface 22 and 23 respectively that is engageable with the side of walkway 2 for properly positioning blade 14 to form groove 13, as will hereinafter be described.

Edging blade 14 extends rearwardly beyond rear edge 8 of foot plate 3 to form a first relief opening 24 between rear edge 8 of foot plate 3 and leg 19. Foot plate 3 includes a second relief opening 25 formed therethrough adjacent leg 18 and the upper edge of blade 14. Relief openings 24 and 25 permit lawn or turf to be forced therethrough during edging to prevent jamming of a strip of lawn in the corners defined between the upper edge of blade 14, bottom surface 5 of foot plate 3 and legs 18 and 19.

Lawn edger 1 further includes an elongated tubular handle 26 having an upper end including a grip portion 27 engageable by a user and a lower end attached, as by welding, to the forward end of foot plate 3 adjacent opening 25.

The use of lawn edger 1 for edging or trimming lawn is best illustrated in FIGS. 1 and 3. Edger 1 is first positioned adjacent walkway 2 so that abutment surfaces 22 and 23 directly abut against the side edge of walkway 2. Thereafter, a user stands on top surface 4 of foot plates to drive cutting edge 15 into the lawn to cut out a rectangular section or strip 12 immediately adjacent walkway 2. This process is continued along the entire walkway 2 until the desired length of edging is accomplished. Then, the user orientates edger 1 so that guide surface 9 directly abuts against the top edge of walkway 2 with the curved outer end 11 of lifting blade 10 positioned beneath a cut strip of lawn 12 as shown in FIG. 4. Edger 1 is then forced along the top of walkway 2 so that lifting blade 10 lifts or removes the cut strips of lawn 12 leaving groove 13 adjacent walkway 2.

A device for edging lawns adjacent walkways and the like and for removing strips of lawn cut thereby has been illustrated and described. Various modifications and/or substitutions of the specific components described therein may be made without departing from the scope of the invention. For example, instead of being manufactured as a single tool, the present invention could be manufactured as two separate tools, i.e. one for edging lawns and a second for removing the cut strip of lawn.

Various modes of carrying out the invention are contemplated as being within the scope of the following claims particularly pointing out and distinctly claiming the subject matter which is regarded as the invention.

I claim:

1. A device for edging lawns adjacent walkways and the like, comprising:
   a foot plate including forward and rearward ends and a substantially flat foot-receiving surface thereon;
   an elongated handle having an upper end including a grip portion engageable by a user and a lower end operatively attached to said foot plate;
   an edging blade depending from said foot plate having forward and rearward ends and an upper edge attached to said foot plate and a lower cutting edge, said blade including an inner side facing the walkway and an outer side opposite said inner side facing a lawn when said lower edge is forced downwardly to edge a lawn; and
   spacer means including a first integral leg at said forward end and a second integral leg at said rearward end projecting inwardly from the inner side of said blade wherein said first and second legs include lower cutting edges located in a coplanar relationship with the cutting edge of said blade to form a channel-shaped blade and further including an abutment surface engageable with the walkway for positioning said blade in spaced relation to the walkway when said blade is forced downwardly to edge the lawn, said edging blade extends rearwardly beyond the rearward end of said foot plate to form a first relief opening between the rearward end of said foot plate and said second integral leg, and said foot plate includes a second relief opening formed therethrough adjacent said first integral leg to prevent the jamming of a strip of lawn between said blade, foot plate and legs.

2. The device of claim 1, wherein said foot plate includes inner and outer edges and the upper edge of said blade is attached to said foot plate along said outer edge.

3. The device of claim 1, wherein said foot plate includes forward and rearward ends and the lower end of said handle is attached to said foot plate at said forward end.

4. A device for removing material such as strips of lawn or dirt adjacent a ledge such as formed by a walkway or the like, comprising:
   a plate member including a guide surface engageable with the top of said ledge;
   an edging blade depending from a first side of said plate member for cutting a strip of lawn adjacent a walkway;
   an elongated handle engageable by a user and having a lower end operatively attached to said plate member;
   a projection on said plate member extending substantially perpendicular to said guide surface having an outer end to be positionable in a groove adjacent to said ledge with said plate member first side facing downwardly and said guide surface forced along the top of said ledge with said outer end of said projection lifting the lawn or dirt leaving a desired groove adjacent the ledge; and
   spacer means projecting from one side of said edging blade and including an abutment surface engageable with a walkway for positioning said edging blade in spaced relation to a walkway when said edging blade is forced downwardly to edge a lawn, said edging blade includes forward and rearward ends and said spacer means includes a first integral leg at said forward end and a second integral leg at said rearward end.

5. The device of claim 4, wherein said edging blade includes a lower cutting edge, and said legs each include a lower cutting edge located in a coplanar relationship with the cutting edge of said edging blade to form a channel-shaped edging blade.

6. A device for edging lawns adjacent walkways and the like and for removing strips of lawn cut thereby, comprising:
   a foot plate including forward and rearward ends and a substantially flat foot-receiving surface thereon;
   an elongated handle having an upper end including a grip portion engageable by a user and a lower end attached to said foot plate;
   an edging blade including forward and rearward ends and a lower cutting edge depending from said foot plate for cutting a strip of lawn adjacent a walkway; spacer means including a first integral leg at said forward end and a second integral leg at said rearward end projecting from one side of said edging blade and including an abutment surface engageable with a walkway for positioning said edging blade in spaced relation to a walkway when said edging blade is forced downwardly to edge a lawn; and a lifting blade projecting from said foot plate having an outer end positionable beneath a cut strip of lawn to lift the cut strip of lawn leaving a desired groove adjacent a walkway, said edging blade extends rearwardly beyond the rearward end of said foot plate to form a first relief opening between the rearward end of said foot plate and said second integral leg, and said foot plate includes a second relief opening formed therethrough adjacent said first integral leg to prevent the jamming of a strip of lawn between said blade, foot plate and legs.

7. A device for edging lawns adjacent walkways and the like, comprising:

a foot plate including forward and rearward ends and a substantially flat foot-receiving surface thereon;

an elongated handle having an upper end including a grip portion engageable by a user and a lower end operatively attached to said foot plate;

an edging blade depending from said foot plate having forward and rearward ends and an upper edge attached to said foot plate and a lower cutting edge, said blade including an inner side facing the walkway and an outer side opposite said inner side facing a lawn when said lower edge is forced downwardly to edge a lawn; and spacer means including a first integral leg at said forward end and a second integral leg at said rearward end projecting inwardly from the inner side of said blade wherein said first and second legs include lower cutting edges located in a coplanar relationship with the cutting edge of said blade to form a channel-shaped blade and further including an abutment surface engageable with the walkway for positioning said blade in spaced relation to the walkway when said blade is forced downwardly to edge the lawn, said edging blade extends rearwardly beyond the rearward end of said foot plate to form a first relief opening between the rearward end of said foot plate and said second integral leg, and further including a second relief opening formed adjacent said first integral leg, said relief openings to prevent the jamming of a strip of lawn between said blade, foot plate and legs.

8. A device for removing material such as strips of lawn or dirt adjacent a ledge such as formed by a walkway or the like, comprising:

a plate member including a guide surface engageable with the top of said ledge;

an edging blade depending from a first side of said plate member for cutting a strip of lawn adjacent a walkway;

an elongated handle engageable by a user and having a lower end operatively attached to said plate member;

a lifting blade extending substantially perpendicular to said guide surface having an outer end to be positionable in a groove adjacent to said ledge with said plate member first side facing downwardly and said guide surface forced along the top of said ledge with said outer end of said lifting blade lifting the lawn or dirt leaving a desired groove adjacent the ledge; and spacer means projecting from one side of said edging blade and including an abutment surface engageable with a walkway for positioning said edging blade in spaced relation to a walkway when said edging blade is forced downwardly to edge a lawn, said edging blade includes forward and rearward ends and said spacer means includes a first integral leg at said forward end and a second integral leg at said rearward end.

* * * * *